Oct. 5, 1965 D. S. STREET 3,210,665

MOBILE RADIO WITH TIMING CIRCUIT FOR AUTOMATICALLY ENERGIZING THE TRANSMITTER UPON RECEIPT OF A CALL

Filed Dec. 31, 1962 2 Sheets-Sheet 1

INVENTOR.
DAN S. STREET
BY J. David Blumenfeld

INVENTOR
DAN S. STREET

BY J David Blumenfeld
ATTORNEY 3,210,665

MOBILE RADIO WITH TIMING CIRCUIT FOR AUTOMATICALLY ENERGIZING THE TRANSMITTER UPON RECEIPT OF A CALL

Dan S. Street, Raleigh, N.C., assignor to General Electric Company, a corporation of New York Filed Dec. 31, 1962, Ser. No. 248,657
8 Claims. (Cl. 325—55)

This invention relates generally to selective calling systems and more particularly to calling systems suitable for use with remotely located radio communication equipment.

In two-way mobile radio communication systems one or more central or base stations must communicate with one or more of a plurality of remote mobile stations. It is common in systems of this sort to establish communication with any one selected mobile station by transmitting a predetermined identifying tone signal which is associated specifically with the selected mobile station. The individual receivers located at each remote mobile station are designed to recognize only the predetermined identifying tone, which tone conditions the receiver to reproduce the subsequent message. In such systems, the equipment is often maintained in a STANDBY condition, i.e., with the receiver normally energized to be operative for reception of the identifying tone and the transmitted signals, but with the corresponding remote transmitter turned off to minimize current drain on the battery.

In mobile radio communication equipment of this type, it is also customary to provide an external alarm, such as an audible or visual signal, upon receipt of the identifying signal to alert a subscriber or operator, who may be in the immediate vicinity of the remote receiver but who is not located right at the receiver. When the alarm is sounded, the subscriber or operator must return to the receiver, energize the transmitter by connecting the supply voltage, wait for the transmitter to warm up before answering. These time-consuming steps must necessarily be accomplished before the calling party abandons the call, if the subscriber wishes his answer to be heard. If the calling party has abandoned the call, the subscriber may either wait at the remote unit in expectation of the call being placed again, or return to his previous activity. Should he choose to return and leave the mobile unit, the above sequence of events may very well repeat themselves. In any event, the subscriber, who may be a field supervisor for a work team, for example, and away from the mobile unit a substantial portion of time, may be greatly inconvenienced. Nor can this difficulty be solved by leaving the transmitter continuously energized, particularly when the vehicle is stationary and the operator away from the vehicle since the current drain on the battery and the consequent reduction in the life of the battery makes this solution prohibitive.

In the present invention, the disadvantages of the prior art systems are overcome, and provision is made for reducing the period of time required to complete a call. The problem of excessive current drain on the battery is avoided by reducing the probability of unanswered return calls. Accordingly, it is an object of this invention to provide an improved selective calling system for intercommunication between one or more central stations and a plurality of remote subscribing stations where the subscriber may be in the vicinity of the remote station.

Another object of this invention is to provide an improved selective calling system for intercommunication between one or more fixed stations and a plurality of remote subscribing stations arranged to notify a subscriber distant from a remote station of a present call.

A further object of this invention is to provide an improved selective calling system for intercommunication between one or more fixed stations and a plurality of remote subscribing stations arranged to condition a remote station for immediate transmission by the subscriber.

Yet another object of this invention is to provide an improved selective calling system for intercommunication between one or more fixed stations and a plurality of remote subscribing stations arranged to notify a subscriber distant from a remote station of a present call and simultaneously condition the remote station transmitter for immediate transmission by the subscriber.

With the above objects in mind, there is provided in one form of the invention, a circuit arrangement for use with a selective calling system of the type in which the receiver is maintained in the standby or normally energized condition and includes a visual or audible alarm which is actuated to notify any subscriber in the vicinity of the remote station that he is being called. Upon receipt of a predetermined identifying tone signal and actuation of the alarm, a timing circuit is simultaneously energized. The timing circuit controls the firing of a transistor control circuit which connects the circuits of the transmitter of the remote subscribing station to a power supply or power source thereby conditioning the transmitter for immediate transmission by any party answering the call. The timing circuit has a time constant such that the control circuit is energized for a predetermined period, which may be approximately twenty seconds, after receipt of the call and actuation of the alarm. This permits sufficient time for a subscriber, who may be in the vicinity of the remote unit, to return to the unit while the remote transmitter is warming up. Upon reaching the remote unit, the remote transmitter is suitably "warmed up" or conditioned for immediate transmission. In the event the call remains unanswered, the control circuit is deenergized, thus removing the voltage from the remote transmitter and minimizing battery drain. If the call is repeated and the alarm again actuated, the transmitter energizing voltage is again supplied for an additional twenty seconds. This process continues until the call is answered or the calling party abandons his efforts to reach the called party.

While the specification concludes with claims particularly pointing out and distinctly claiming the subject matter regarding the invention, it is believed the invention will best be understood by reference to the following description taken in connection with the accompanying drawings in which:

Figure 1:
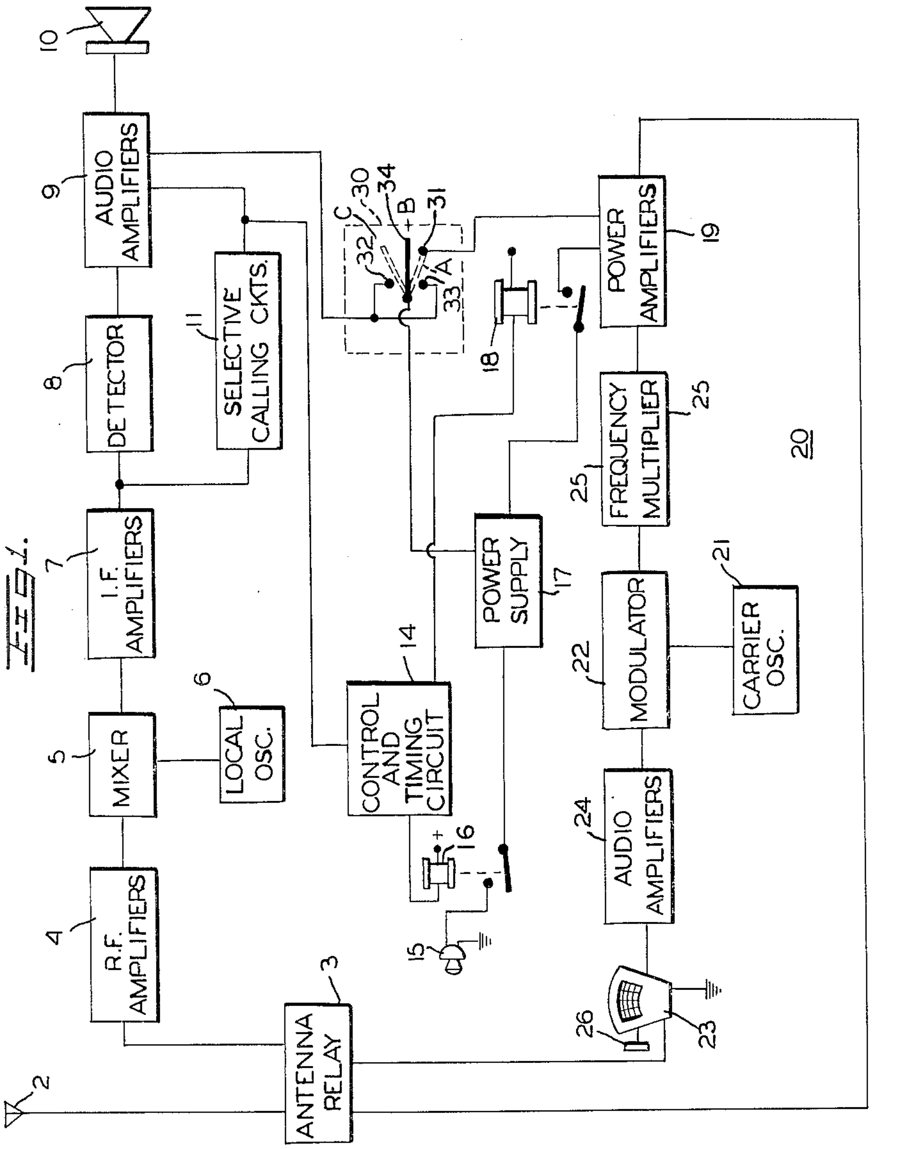
FIG. 1 is a block diagram of the receiver-transmitter combination.

FIG. 1 illustrates in block diagram form a transmitter and receiver arrangement which incorporates a selective calling system for conditioning the receiver to receive a message in response to an identifying signal, an alarm system actuated in response to the identifying signal, and a control circuit for applying power to the transmitter for a fixed period of time after initiation of the alarm so that the operator may respond immediately to the call. The receiver shown generally at 1 includes an antenna 2 which intercepts the transmitted signal, couples it through antenna relay circuits 3 to one or more R.F. amplifiers 4 in which the signals are amplified. The amplified signals are applied to a mixer 5 along with a local oscillator signal from oscillator 6 and converted to a lower intermediate frequency (I.F.) signal. The I.F. signal is further amplified in one or more I.F. amplifier stages 7 and applied to a detector 8 where the audio intelligence is recovered from the signal. The audio signal is amplified in one or more audio amplifier stages 9 and applied to a reproducing element such as a loud speaker 10.

Audio amplifier 9 is controlled by a selective calling channel 11 so that the audio intelligence is reproduced only if the identifying signal for the particular receiver is present. The selective calling system may be one of many well known circuits for this purpose. For a discussion of Selective Calling Systems, both of the tone type and of the digital type, reference is hereby made to pages 180–202 of "Two Way Radio," A. H. Lytel, McGraw-Hill, New York (1959). Suffice it to say that the selective calling circuitry derives a unidirectional control signal from the identifying signal, which may be in the form of individual tones of selected frequencies or digital code pulses. The unidirectional control signal thus derived is utilized to unmute the audio amplifiers and speaker to permit passage of the detected intelligence. That is, the entire receiver is operative except that the audio amplifier and speaker are muted. The appearance of a signal including an identifying signal associated with the particular receiver produces a suitable control signal from the selective calling circuitry 11 to unmute the audio amplifier and speaker.

The unidirectional control signal appearing at the output of selective calling circuitry 11 is also utilized to actuate control and timing circuit 14 which actuates an audible or visible alarm such as the vehicle horn 15, for example, through a relay 16. Relay 16, through its contacts, completes a circuit between horn 15 and a source of electrical power 17 which may be the battery of the vehicle. Control circuit 14 also actuates transmitter control relay 18 for a fixed period of time thereby applying power from source 17 to the power amplifier 19 of transmitter 20 and conditioning it for immediate transmission by the operator when he returns to the vehicle in response to the alarm device 15. In the event that the operator does not return and answer the call within the fixed period of time, relay 18 is deenergized, removing power from the transmitter and thereby minimizing the drain on the vehicle battery. The system is then ready for a repeat call at which time the alarm will again be sounded and the transmitter energized.

Transmitter 20 includes a carrier oscillator 21 which supplies a carrier signal to modulator 22 where it is angularly modulated, as by phase modulation, for example. Audio frequency signals from a microphone 23 are amplified in audio amplifier 24 and applied to modulator 22 to angularly modulate the carrier. The modulated signal is applied to one or more frequency multiplying stages 25 to raise the frequency to the desired final carrier frequency. The modulated signal is then applied to power amplifier 19 wherein the signal is amplified to the desired power level for transmission. Microphone 23 also includes a push-to-talk switch 26 which energizes antenna relay 3 to switch antenna 2 from the receiver to the output of transmitter power amplifier 19 thereby transmitting the angularly modulated signal into free space.

A three-position switch, which may be directly associated with the ignition switch of the vehicle, is illustrated at 30 and provides additional operational flexibility. Switch 30 has ON, OFF and STANDBY positions, shown at A, B and C respectively, whereby the operator may, at his discretion, continuously maintain the transmitter energized in ON position A as would be the case where the operator is continuously in the vehicle, terminate operation of the system by deenergizing both receiver and transmitter in OFF position B in the event he is leaving the vehicle or its vicinity permanently, or activate the transmitter for a fixed period of time in the STANDBY position C in the event he is in the vicinity of the vehicle and wishes to be alerted by operation of the alarm in response to an incoming message. Switch 30 includes a contact arm 31 connected to power source 17 which is movable between switch contacts 32, 33 and 34. Contacts 32 and 33 are both shown schematically as connected to the receiver through audio amplifier 9. It will be understood, however, that these contacts are connected to all of the receiver circuits to supply energizing voltage thereto and thereby maintaining the receiver operative (with the exception of the audio stages and the speaker which are muted until unmuted by the selective calling circuitry 11), whenever the switch contact arm 31 is in the ON or STANDBY positions. Switch contact 34 is connected to transmitter, as schematically illustrated by the connection to power amplifier 19. Again, it must be understood that switch contact 34, as well as transmitter control relay 18, functions to supply power from source 17 to all of the transmitter circuits, whenever the switch contact arm is in the ON position.

Figure 2:
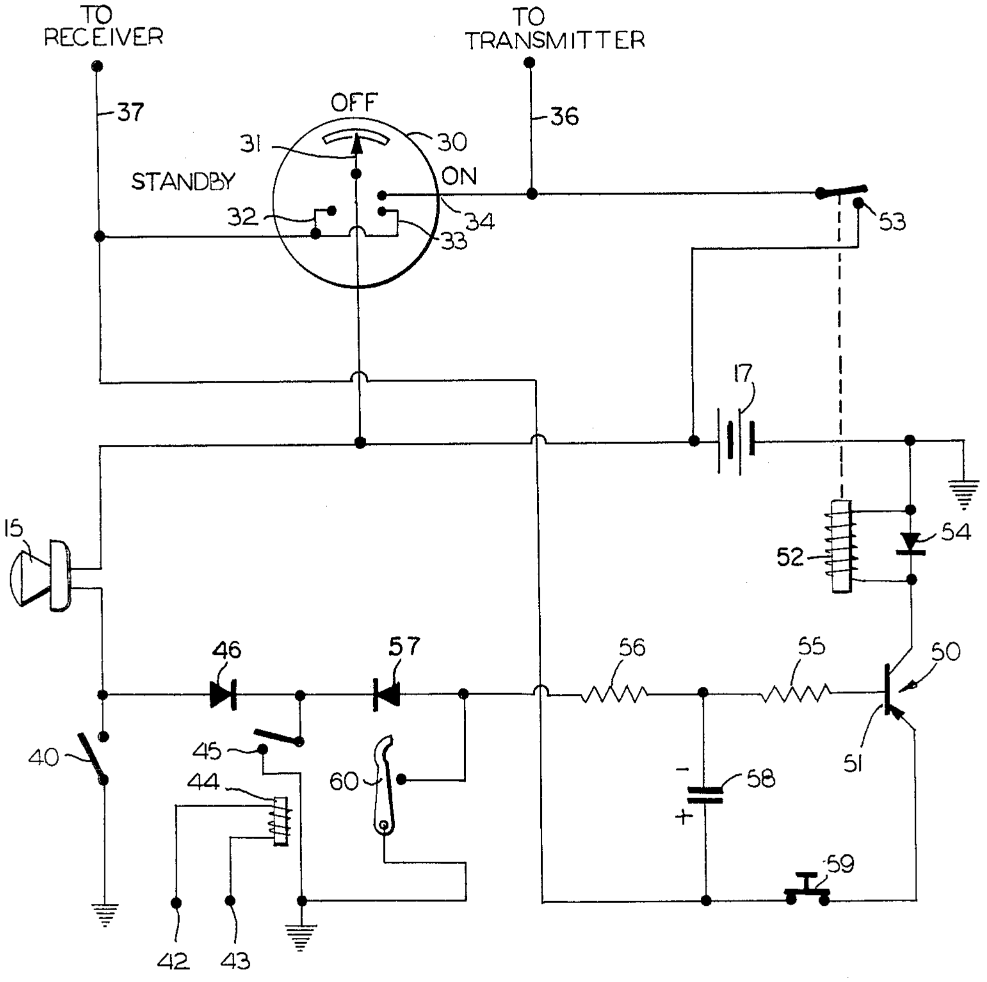
FIG. 2 is a schematic circuit diagram of the timing and control circuit.

FIG. 2 illustrates the control circuit shown as a block in FIG. 1 which circuit is constructed in accordance with the principles of this invention. A three-position switch 30, as described previously, is provided having ON, OFF and STANDBY positions. Arm 31 of switch 30 is connected to the positive terminal of power source 17 which has its negative side grounded and which may, for example, be the vehicle's battery. When contact arm 31 is in the ON position, line terminal 36 leading to the transmitter and line terminal 37 leading to the receiver are connected to power source 17 through switch contacts 33 and 34 there supplying power to those units. When contact arm 31 is in the STANDBY position, only the receiver is connected to the power source through line terminal 37 and switch contacts 33 and 34. In the OFF position, the receiver and transmitter are both disconnected from the power source 17.

Alarm 15, which may, for example, be the horn of a vehicle in which the remote transmitter and receiver units of the selective calling system are located or any other suitable audible or visual alarm, is connected across power source 17. Switch 40 is a manual alarm activating switch and may represent the horn button within the vehicle within which the remote transmitter and receiver units are mounted. Switch 40 is connected in the alarm circuit so as to provide a manual control for activating the alarm.

When an operator located at a central or base station desires to call a remote subscriber, who may be at or in the vicinity of a remote mobile unit, the operator, in a manner known in the art, transmits an identifying signal, either as dial pulses in a predetermined sequence of code signals (as in Mobile Telephone Service, for example) or as predetermined tone combinations. At the remote receiver, the signal is applied to a selective calling channel which includes suitable decoding or converting circuitry to convert either the dial code or the tones to the desired control signal. It should be readily apparent that each subscriber or mobile is assigned a code number or tone combination and only that receiver corresponding to the predetermined code or tone will have its alarm activated to warn or notify the subscriber that he is being called.

Upon receipt of the predetermined identifying signal at the receiver, the control signal from the output of the selective calling circuitry is applied across line terminals 42 and 43 to energize relay 44 which forms part of control and timing circuit 14. Contacts 45 of relay 44, when closed, establish a ground connection for the alarm 15 through diode 46 which is so poled as to prevent accidental activation of the timing circuit when the alarm switch 40 is manually operated. The closing of contacts 45 also serves to provide a ground return path for the transistorized control circuit shown generally at 50.

The control circuit 50 comprises PNP transistor 51 having its collector tied to ground through the operating coil of transmitter control relay 52. With the remote receiver in the STANDBY position, actuation of relay 52 closes contacts 53 and connects the transmitter to the power source 35. Diode 54, connected across the operating coil of relay 52, serves to protect transistor 51 from damage due to any inductive surges from the operating coil of relay 52.

The base electrode of transistor 51 is connected to contacts 45 of relay 44 through serially connected resistors 55 and 56 and diode 57. Timing capacitor 58 is connected between the junction of resistors 55 and 56 and the positive terminal of power source 17. Resistors 55 and 56 and capacitor 58 constitute a timing circuit for controlling the duration of the conduction of transistor 51, which timing circuit has different charge and discharge time constants. Resistor 56 is smaller than resistor 55 and the time constant for charging capacitor 58 when relay 44 is energized is smaller than the time constant of the discharge path when transistor 51 is energized.

A disable switch 59 is connected in the base-emitter circuit of transistor 51 to allow the subscriber to disable the transistorized power control circuit 50. The control circuit 50 is activated by the appearance of a control signal at line terminals 42 and 43 which energizes relay 44 or by closing the hook switch 60. Removal of the handset in the remote unit by the subscriber establishes a ground return through hook switch 60 to supply voltage to the transmitter until the handset is replaced in its original position.

In operation of the circuit, when the remote subscriber or operator finds it necessary to leave the immediate vicinity of the remote receiver, switch 30 is placed in the STANDBY position thus applying energizing voltage to the receiver while disconnecting the transmitter supply voltage. The handset is left on its hook, thus opening the contacts of hook switch 60 and relays 44 and 52 are deenergized.

When a call is initiated to a selected remote station, a control signal from the receiver's selective calling circuits appears at line terminals 42, 43 and energizes the alarm activating relay 44 which thereby completes a circuit from supply source 17 to alarm 15 and capacitor 58. Capacitor 58 charges rapidly through resistor 56, diode 57 and the contacts 45 toward the voltage level of battery 17 and with the polarity shown. When the voltage across capacitor 58 reaches a predetermined level, PNP transistor 51 conducts energizing relay 52. When the tone signal at line terminals 42, 43 disappears, relay 44 is deenergized and its contacts 45 open allowing capacitor 58 to discharge through resistor 55 and the base-emitter junction of transistor 51. The time constants of the charging and discharging circuits are so selected that the charging time of capacitor 58 is less than two hundred milliseconds, while discharge time is approximately twenty seconds, i.e., a ratio of 1 to 100. This maintains transistor 51 in the conducting state for the twenty-second period, and relay 52 in the energized state for the same period of time. Closing of relay contacts 53 connects power source 17 to the transmitter to condition the transmitter for immediate transmission by any person answering the call.

If the call is not answered within twenty seconds, transistor 51 ceases to conduct, deenergizing relay 52 and removing power from the transmitter. If the call is repeated, the alarm is again sounded and voltage is supplied to the transmitter for another twenty second period. This process continues until the call is answered or the calling party abandons the call. But each time a call is unanswered, the receiver at the remote station reverts to its STANDBY condition after the timing period. When the subscriber answers the call, the handset is removed from the hook switch thus closing the hook switch and energizing transistor 51. This supplies voltage continually to the transmitter until such time as the handset is replaced on the hook switch thus opening the circuit and deenergizing transistor 51.

From the foregoing description, it is apparent that a selective calling system is provided for intercommunication between a central station and a remote station which will permit economic use of the remote system power supply by providing negligible current drain while permitting a subscriber to answer a call without undue delay. To this end, there is provided a timing and control circuit arrangement for use with selective calling systems in which the receiver at the remote station is maintained in a normally energized condition. The remote station includes an external alarm to notify a subscriber who may be in the vicinity that he is being called. Upon receipt of the predetermined tone signal, the alarm is activated and the timing and control circuits are energized connecting the power source to the remote transmitter of the selective calling system, thereby conditioning the transmitter for immediate transmission by any person answering the call.

The timing circuit has a time constant such that the voltage to the remote transmitter is applied for a period of twenty seconds after receipt of the call and activation of the alarm in order to minimize battery drain in the event the call remains unanswered. If the call is repeated and the alarm is again activated, the voltage is again supplied for another twenty second period. This process continues until the call is answered or the calling party abandons the call.

Although a particular embodiment of the subject invention has ben described, many modifications may be made and it is intended by the appended claims to cover all such modifications which fall within the true spirit and scope of the invention.

What is claimed as new and desired to be secured by Letters Patent is:

1. In a selective calling system for intercommnication between a central station and a remote station, the combination comprising: a normally inactive transmitter located at said remote station, a normally energized receiver located at said remote station, a power source, means connecting said power source to said receiver, an alarm energized in response to the reception of an identifying signal at said receiver, a timing circuit simultaneously energized upon reception of the identifying signal at said receiver, and a transmitter control circuit, means responsive to the energization of said timing circuit for actuating said control circuit and connecting the transmitter to the power source and maintaining the transmitter energized for a predetermined period of time after said identifying signal is no longer received to condition the transmitter for transmission during said predetermined period of time, and operator controlled manual means for connecting said source to said control circuit upon response of the operator to a call.

2. In a selective calling system for intercommunication between a central station and a remote station, the combination comprising: a normally inactive transmitter located at said remote station, a normally energized receiver located at said remote station, a power source, means connecting said power source to said receiver, an alarm energized in response to the reception of a predetermined identifying signal at said receiver, a timing circuit simultaneously energized upon reception of the signal at said receiver, said timing circuit including an electric energy storing device having a low impedance charge path and a high impedance discharge path whereby the discharge time of said electric energy storing device is substantially longer than the charge time, and a control circuit responsive to the energization of said electric energy storing device for connecting said transmitter to said power source and maintaining the transmitter energized for a predetermined period of time after said identifying signal is no longer received to condition the transmitter for transmission during said predetermined period of time.

3. The selective calling system as set forth in claim 2 wherein said low impedance charge path is of such magnitude to provide a charge time of approximately 200 milliseconds and said high impedance discharge path is of such magnitude to provide a discharge time of approximately twenty seconds after said identifying signal is no longer received.

4. The selective calling system as set forth in claim 2 wherein said control circuit further includes a transistor, means connecting said transistor to the electric energy storing device for controlling the energization of said transistor in response to the energization of said storing device, and relay means responsive to the energization of said transistor for connecting the transmitter to the power source.

5. In a selective calling system for intercommunication between a central station and a remote station, the combination comprising: a normally inactive transmitter located at said remote station, a normally energized receiver located at said remote station, a power source, first means connecting said power source to said receiver, second means energized in response to the reception of a predetermined identifying tone signal at said receiver, an alarm activated in response to the energization of said second means to inform the operator of said reception, operator controlled manual means for connecting said power source to said transmitter whenever the operator responds to a call, a timing circuit disposed to be energized in response to the energization of said second means, a transmitter control circuit, means responsive to the energization of said timing circuit for actuating said control circuit and connecting the transmitter to the power source and maintaining the transmitter energized for a predetermined period of time after said identifying tone signal is no longer received to condition the transmitter for transmission during said predetermined period of time after which time said transmitter is again deenergized unless the operator actuates said manual means in response to the call.

6. The selective calling system as set forth in claim 5 wherein said timing circuit includes an electric energy storing device having a low impedance charge path and a high impedance discharge path whereby the discharge time of said electric energy storing device is substantially longer than the charge time.

7. The selective calling system as set forth in claim 6 wherein said low impedance charge path is of such, magnitude to provide a charge time of approximately 200 milliseconds, and said high impedance discharge path is of such magnitude to provide a discharge time of approximately twenty seconds.

8. The selective calling system as set forth in claim 6 wherein said control circuit further includes a transistor, means connecting said transistor to the electric energy storing device for controlling the energization of said transistor in response to the energization of said storing device, and relay means responsive to the energization of said transistor for connecting the transmitter to the power source.

References Cited by the Examiner

UNITED STATES PATENTS

| | | | |
|---|---|---|---|
| 2,129,332 | 9/38 | Mastini | 343—177 |
| 2,250,578 | 7/41 | Finch | 325—183 |
| 2,766,324 | 10/56 | Peth | 325—22 |

FOREIGN PATENTS

| | | |
|---|---|---|
| 677,836 | 8/52 | Great Britain. |
| 902,031 | 7/62 | Great Britain. |

DAVID G. REDINBAUGH, *Primary Examiner.*